United States Patent [19]

Brock, Jr.

[11] 4,169,449
[45] Oct. 2, 1979

[54] CYLINDER DE-ACTIVATOR SYSTEM

[76] Inventor: Horace T. Brock, Jr., Box 238, Ehrenberg, Ariz. 85334

[21] Appl. No.: 848,937

[22] Filed: Nov. 7, 1977

[51] Int. Cl.² .................................................. F02D 13/06
[52] U.S. Cl. ................................. 123/198 F; 123/90.43
[58] Field of Search ............... 123/198 F, 90.43, 90.46, 123/90.63, 90.12, 90.13

[56] References Cited

U.S. PATENT DOCUMENTS

| | | | |
|---|---|---|---|
| 2,948,274 | 8/1960 | Wood | 123/198 F |
| 3,964,455 | 6/1976 | Brown | 123/90.43 |
| 4,050,435 | 9/1977 | Fuller, Jr. et al. | 123/198 F |
| 4,061,123 | 12/1977 | Janes | 123/198 F |
| 4,064,861 | 12/1977 | Schulz | 123/198 F |
| 4,114,588 | 9/1978 | Jordan | 123/198 F |

*Primary Examiner*—Ira S. Lazarus
*Attorney, Agent, or Firm*—Charles C. Logan, II

[57] ABSTRACT

A cylinder de-activator system for an internal combustion engine having a block, an engine head, a plurality of engine cylinders in the block, intake and exhaust valves for each engine cylinder spring-loaded to their closed positions, a cam operated valve train operating each of the valves with the valve train having a rocker lever that is rockingly connected to a mounting stud extending upwardly from the engine head, and hydraulic means for varying the fulcrum position on the mounting studs about which the rocker lever rocks.

6 Claims, 5 Drawing Figures

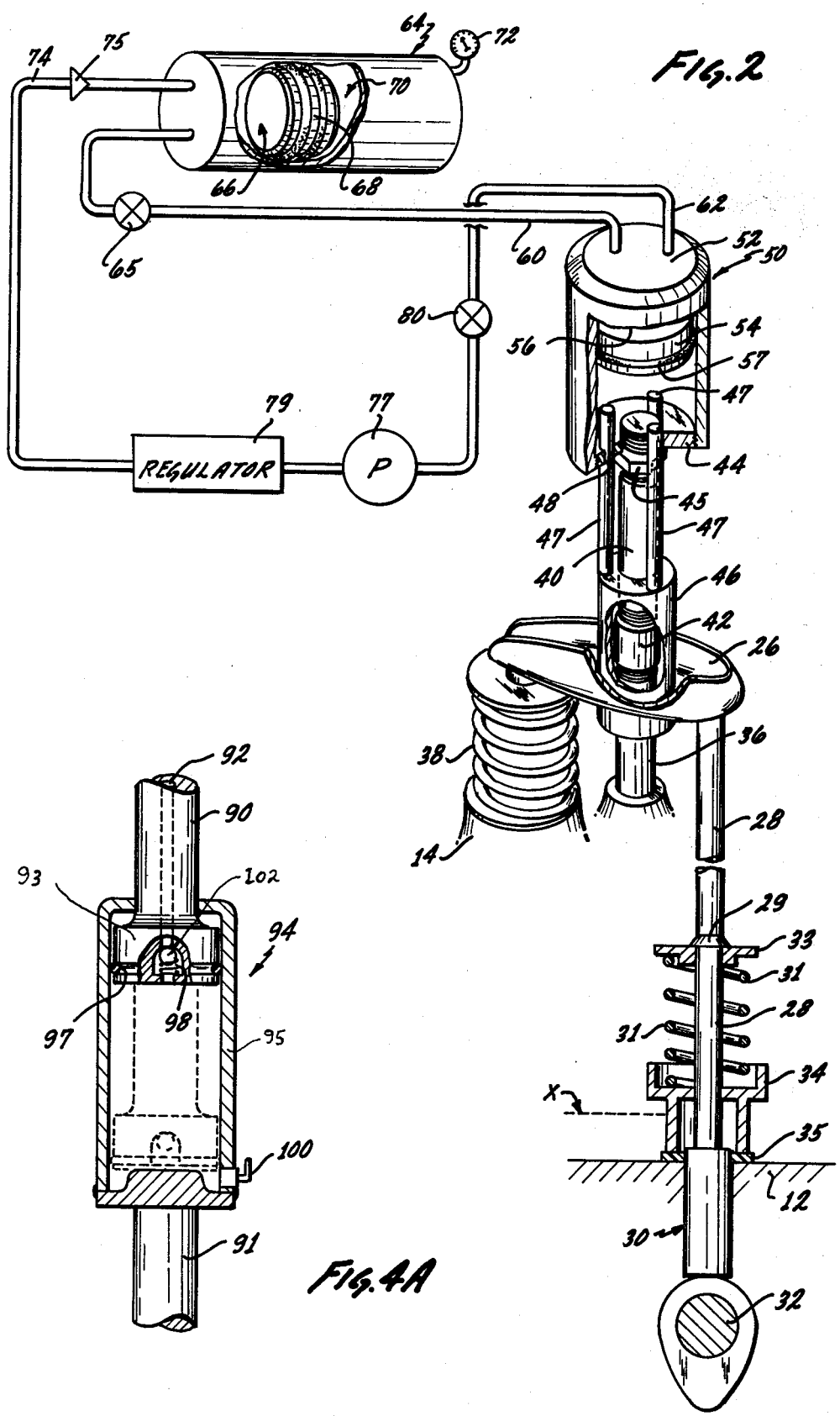

CYLINDER DE-ACTIVATOR SYSTEM

BACKGROUND OF THE INVENTION

The invention relates to a multi-cylinder internal combustion engine and in particular, to means for making a selected number of the cylinders of the engine inoperative whereby to cause the engine to operate on less than all of its cylinders, and thusly change the operating characteristics and fuel consumption of the engine so that it will operate at a fraction of its power output and at a corresponding reduction in fuel consumption whenever full power is not required.

In the past, several inventions have been developed for inactivating a selected number of cylinders of an engine during different stages of its operation in order to reduce fuel consumption. One such device is illustrated in U.S. Pat. No. 2,197,529, wherein the inventor utilizes two inlet manifolds. Certain of the cylinders are connected to one manifold and the others to the other manifold. By arresting the flow of fuel into one of the manifolds, while delivery is continued to the other manifold, half of the cylinders of the engine are de-activated, thus resulting in a conservation of fuel; for instance, in an automobile that stops at frequent intervals while permitting the engine to run idly while the driver attends to some errands.

Another device for inactivating predetermined cylinders of an internal combustion engine is illustrated in U.S. Pat. No. 2,528,983. In this system, each of the intake and exhaust valves have a plurality of cams with which each may be brought into contact. Depending on which of these cams the bottom of the valve comes into contact with, determines whether the valve will open or not. These cams are moved by shifting the camshaft laterally to change the operation of the exhaust and intake valves.

A third system for de-activating predetermined cylinders of an internal combustion engine is illustrated in U.S. Pat. No. 2,948,274. In this device, the desired results are effected by locking the valve lifter mechanism of the exhaust valve of each said selected cylinder out of operation after the exhaust valve has been opened. Normal operation is resumed by releasing the locked valve lifters.

Numerous other attempts have been made to devise cylinder de-activator systems for internal combustion engines but most have not been successfully received by the public.

It is an object of the invention to provide a cylinder de-activator system that may be retrofitted to internal combustion engines presently in operation on the highways.

It is also an object of the invention to provide a novel cylinder de-activator system that may be installed on a typical internal combustion engine by changing as few parts as possible.

It is a further object of the invention to provide a novel cylinder de-activator system that can be adapted to a typical internal combustion engine by a do-it-yourself mechanic.

It is an additional object of the invention to provide a novel cylinder de-activator system that can de-activate any number of cylinders on a given engine by simply stopping the air/fuel flow and exhaust gas flow in that cylinder.

It is an additional object of the invention to provide a novel cylinder de-activator system which immobilizes the normal up and down reciprocal motion of the push rod.

It is an additional object of the invention to provide a novel cylinder de-activator system using a hydraulic method of de-activating the valves, thereby attaining a cushion effect which causes less mechanical shock on the the valve train than a strictly mechanical mechanism when reactivating the valve at high speeds.

SUMMARY OF THE INVENTION

The cylinder de-activator system is to be utilized with an internal combustion engine having a block, an engine head, a plurality of engine cylinders in the block, intake and exhaust valves for each cylinder spring loaded to their closed positions, and a cam operated valve train operating each of the valves by utilizing a rocker lever having an aperture in its mid-section that allows the rocker lever to be rockingly connected to a mounting stud extending upwardly from the engine head. When the engine is in its normal operating condition, a nut threaded on the top of the mounting stud is tightened down to its proper degree thereby setting the fulcrum of the rocker lever at its proper position to open the valves in response to the upward reciprocating motion of the push rod against one end of the rocker lever.

The novel cylinder de-activator system is relatively easy to install on the tape of internal combustion engine just described. First the nut is threaded off the top of the mounting stud of each of the intake and exhaust valves that are to be de-activated. This then frees the push rods so that they may be removed to allow their bottom ends to be modified in one of the manners described in the description of the preferred embodiments that follows later on in the specification. After the modified push rod has been reinserted into position, the remaining modifications take place entirely above the rocker lever. A hydraulic assembly is attached to the top of the rocker lever above the mounting stud that allows the fulcrum of the rocker lever to be changed by means of hydraulic pressure directed against the top of the rocker lever. The hydraulic assembly has a source of hydraulic fluid under pressure connected to it and also a means for releasing the hydraulic fluid pressure from within the hydraulic assembly. The source of hydraulic fluid under pressure may be the power steering pump of the automobile or an auxiliary pump. A pressure accumulator may be utilized in the system to provide a source of hydraulic fluid under pressure at the time the automobile engine is started, thus eliminating a delay period that would be normal if it were necessary to build up pressure prior to activating any of the previously de-activated cylinders.

Control valves in the fluid circuits of the cylinder de-activator system may be manually, mechanically, or electrically operated either by controls mounted under the hood of the automobile or mounted on the dash inside of the automobile. It is also possible to set up the system so that each individual cylinder may be de-activated separately, or a bank of cylinders may be deactivated by a single set of controls.

DESCRIPTION OF THE DRAWINGS

FIG. 2 is a schematic illustration of the cylinder de-activator system showing how it is attached to the exhaust and intake valve train;

FIG. 4a is an enlarged cross sectional view of the push rod assembly utilized in the embodiment illustrated in FIG. 4.

DESCRIPTION OF THE PREFERRED EMBODIMENT

Figure 1:
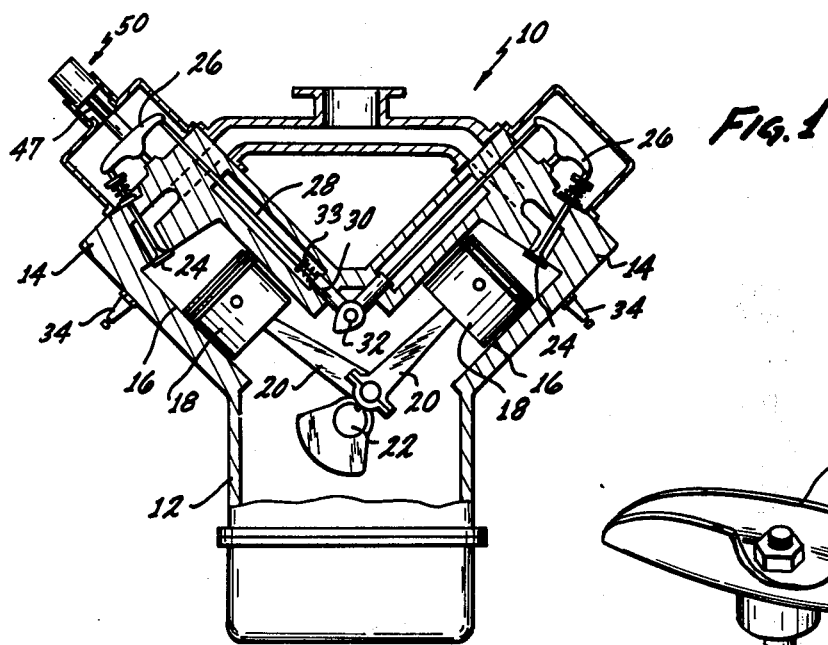
FIG. 1 is a front elevation view of the type of internal combustion engine being modified with portions shown in cross section.

The operation of the cylinder de-activator system for an internal combustion engine can best be described by referring to the drawings. In FIG. 1, a typical V-8 engine of the type to which applicant's system can be applied is illustrated. The engine is generally designated numeral 10. It has a block 12 and a pair of engine heads 14. In the conventional cylinders 16 are pistons 18 on connecting rods 20 coupled to a crankshaft 22. Valves 24 are operated through rocker levers 26 by push rods 28, which are actuated through valve lifters 30 by cam shaft 32. Spark plugs 34 are located with their tips extending into the top of the cylinders 16.

The manner in which the above described internal combustion engine is modified by applicant's invention is clearly illustrated in FIG. 2. Extending upwardly from the top of the engine head 14 is a mounting stud 36. Rocker lever 26 has an aperture in its mid-section that allows the rocker lever to be rockingly connected to the mounting stud 36. One end of the rocker lever presses against coil spring 38 that normally keeps the valve 24 closed. The other end of the rocker lever receives the top of push rod 28. The engine normally would have a nut screwed down on the top of mounting stud 36 that is torqued to the proper amount to provide a fulcrum for the rocker lever to rock about when push rod 28 is pushed upwardly by the cam on cam shaft 32. This action causes the rocker lever to compress coil spring 38 and in turn open valve 24. To this basic structure applicant adds his cylinder de-activator system which uses hydraulic means for varying the fulcrum position. By raising the fulcrum position of the rocker lever on the mounting stud a sufficient height, the operation of the intake and exhaust valves 24 is inactivated.

The hydraulic means for varying the fulcrum position of rocker lever 26 will now be described. A second mounting stud is coupled at its lower end to the top of mounting stud 36 by coupling 22. The top end of mounting stud 40 is threaded into a threaded bore in mounting plug 44 that closes the lower end of hydraulic cylinder 50. A sleeve 46 surrounds the mounting stud 36 with its lower end in contact with the top of rocker lever 26. In some instances a ball washer might be inserted between the bottom of sleeve 46 and rocker lever 26 or a similar type structure might be formed on the bottom of sleeve 46. A plurality of force transfer pins 47 have their bottom surface supported by the wall thickness of the top of sleeve 46 that forms a force transfer surface and their upper ends pass through a plurality of bores 48 in the mounting plug 44. These pins 47 move freely in the bores. The height of the hydraulic cylinder above the sleeve 46 can be varied by screwing the top end of mounting stud 40 varying distances into the threaded end of mounting plug 44. Lock nut 45 is used to secure the mounting stud at its desired position.

The hydraulic cylinder 50 is closed at its top by wall surface 52 and it has a piston 54 reciprocally mounted therein which forms a sealed chamber 56 between its top surface 52 and the interior of the cylinder. An O-ring 57 provides sealing contact between the piston and the interior walls of the cylinder. An entrance tube 60 and an exit tube 62 are connected to the sealed chamber 56. A pressure accumulator 64 is connected to entrance tube 60 and has control valve 65. The pressure accumulator 64 functions to maintain a source of hydraulic fluid under pressure. It would have a hydraulic chamber 66 on one side of piston 68 and a nitrogen chamber 70 on its other side. A gauge 72 could be attached to the end of the pressure accumulator to give a reading on the pressure within the nitrogen chamber.

The hydraulic fluid is supplied to the hydraulic chamber under pressure through tube 74. It has a check valve 75 to allow the fluid to only pass in one direction. The means for supplying the hydraulic fluid under pressure is a pump 77 such as that for the power steering of the automobile or an auxiliary gear pump could be utilized. The hydraulic fluid under pressure leaves pump 77 and passes through pressure regulator 79 on its way to the pressure accumulator 64. The exit tube 62 is connected to pump 77 and it has a control valve 80. The operation for varying the height of the fulcrum of the rocker lever 26 is accomplished by directing fluid under pressure into chamber 56 of the hydraulic cylinder 50. This fluid under pressure pushes against piston 54 causing it to travel downwardly until it contacts the top of pins 47. Continued travel of the piston 54 downwardly causes sleeve 46 to travel axially downwardly along the mounting stud 36 causing the fulcrum of the rocker lever to travel downwardly also. When the sleeve has traveled downwardly a pre-determined distance, the upward travel of the push rod 28 will cause valve 24 to be opened due to the rocker lever 26 rocking about its fulcrum point. In order to de-activate the operation of the valve, it is merely necessary to open control valve 80 which decreases the pressure within chamber 56 and causes sleeve 46 to move upwardly and along with it the fulcrum of the rocker lever.

When the operation of a valve has been de-activated, the modifications that are made to the bottom of the push rod 28 become operational. Shoulders 29 that have been formed on the bottom of the push rod 28 provide a stop against which collar 33 can rest. The underside of collar 33 receives the upper end of a light compression spring 31 whose lower end is captured in retainer 34. Spring retainer 34 is composed of a magnetized metal. An insulator 35 separates spring retainer 34 from the engine block. During normal operation of the valve train, cam 32 is rotated clockwise causing hydraulic lifter 30 to move from the position shown in FIG. 2 to the dotted line indicated by letter x. When the top of valve lifter 30 has traveled as high as level x, if the valve train has been de-activated, spring retainer 34 will magnetically attract valve lifter 30, thereby taking it out of contact with cam 32. The result is that push rod 28 will not reciprocate up and down while the valve train is deactivated and cam 32 will continue to rotate.

Figure 3:
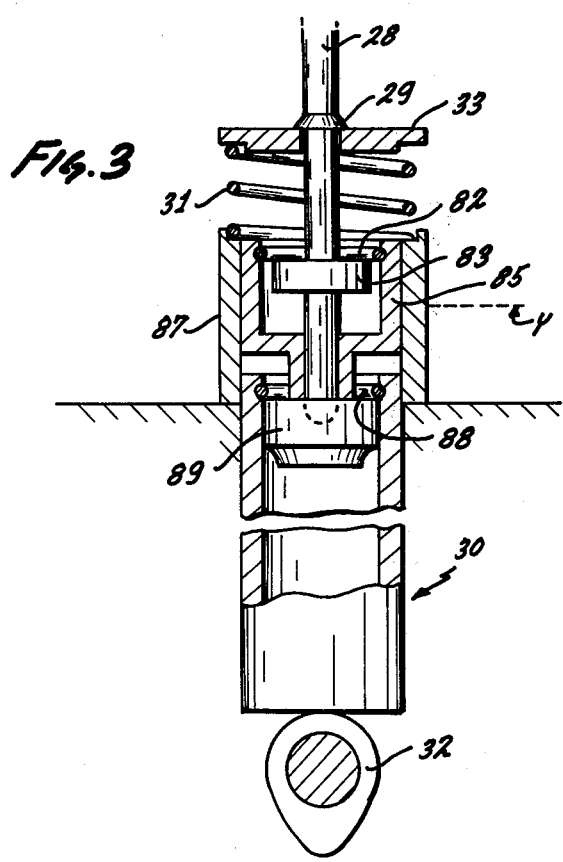
FIG. 3 illustrates an alternative structure that may be attached to the bottom of the push rods.

An alternative modification to the bottom of push rod 28 is illustrated in FIG. 3. In this embodiment, shoulders 29 have also been formed on the push rod for controlling the axial displacement of collar 33. The normal socket 89 in valve lifter 30 is initially removed therefrom and fixedly attached to the bottom of adaptor 85. The lower end of this unit is then reinserted into valve lifter 30 and snap ring 88 positioned back in place. Adaptor 85 has a snap ring 82 that captures collar 83 that has been welded or otherwise fixedly secured on the lower end of push rod 28. A sleeve 87 provides a guide for adaptor 85 and also provides a mounting structure at its top to capture the bottom of light compression spring 31 whose top is captured by collar 33. When the valve train has been deactivated, the rotation by cam 32 will cause valve lifter 30 to have its top surface rise to the position of dotted line y. Since the fulcrum of the rocker lever has been raised upwardly, there will be no downwardly force exerted against push rod 28 and valve lifter 30 will remain at its high point y. This results in the immobility of push rod 28 while cam 32 still continues to rotate.

Figure 4:
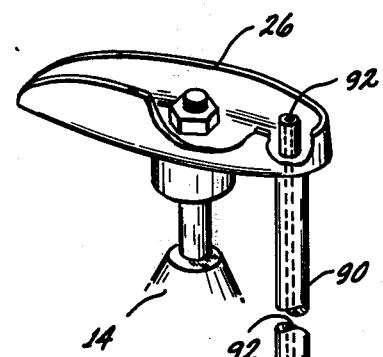
FIG. 4 schematically illustrates an alternative system for de-activating the exhaust and intake valve trains.

An alternative system for de-activating the exhaust and intake valve trains is illustrated in FIGS. 4 and 4a. In this system, a different push rod assembly would have to be substituted for a normal push rod. This push rod assembly is designated numeral 94 and it has an upper push rod 90 and a lower push rod 91. The top of upper push rod 90 is captured by the rocker lever 26. Upper push rod 90 also has a bore 92 extending its length and formed on the bottom of this member is a piston 93. Piston 93 is matingly received in the piston cylinder 95 that is formed at the top of lower push rod 91. Attached to the lower end of push rod 91 is a roller cam follower 96 that maintains contact with cam 32.

The system illustrated in these figures does not required the changing of the fulcrum of the rocker lever 26. Instead, the valve train is deactivated by upper push rod 90 and lower push rod 91, telescoping together a short distance. This action occurs when release valve 100 is opened causing the fluid beneath piston 93 to drain out of cylinder 95. As this occurs, and while cam 32 causes lower push rod 91 to travel upwardly, when it meets no resistance from fluid within the piston cylinder, there will be no force directed by upper push rod 90 against rocker lever 26 that is necessary to open the exhaust or intake valve to which the rocker lever is attached. When it is desired to activate the valve train, it is merely necessary to release fluid under pressure down through bore 92 past ball valve 102 that is held in position by spring 98. At this time, release valve 100 would have been closed and as the pressure builds within piston cylinder 95 upper push rod 90 will be driven upwardly its required distance to bring back into operation the valve train. O-rings 99 and 97 function to seal off the fluid that has been pumped down into piston cylinder 95. The fluid to be utilized in the control circuit could be the same as that illustrated in FIG. 2 with inlet tube 60 being connected to bore 92 and exit tube 62 being connected to release valve 100.

What is claimed is:
1. A cylinder de-activator system for an internal combustion engine comprising:
   a block and an engine head,
   a plurality of engine cylinders in said block, intake and exhaust valves for each engine cylinder spring loaded to their closed positions,
   a cam operated valve train operating each said valve, said valve train comprising a rocker lever that has an aperture in its midsection that allows the rocker lever to be rockingly connected to a first mounting stud extending upwardly from said engine head, one end of said rocker lever presses against a coil spring that normally keeps said valve closed and the other end of said rocker lever receives the top of a push rod,
   hydraulic means for varying the fulcrum position on said first mounting studs about which said rocker lever rocks, said hydraulic means comprising
      a tubular sleeve having said first mounting stud extending upwardly within, the top of said tubular sleeve having a pressure force transfer surface,
      a hydraulic cylinder having integral lateral walls that stretch continuously all the way from the bottom of said hydraulic cylinder to its top, the hydraulic cylinder has a top wall that closes that end of the cylinder, a piston is reciprocally mounted within said hydraulic cylinder and it forms a sealed chamber between its top surface and the interior of said hydraulic cylinder, the hydraulic cylinder has a bottom wall that closes that end of the cylinder, said bottom wall having a plurality of bores passing through it into which a plurality of force transfer pins are inserted, the lower end of said pins are supported on the force transfer surface of said tubular sleeve with the top ends of said pins forming pressure contact surfaces against which said piston is forced when hydraulic fluid under pressure enters said sealed chamber in the hydraulic cylinder to activate the valve for re-activating that cylinder of the engine.
      a fluid pressure system having a source of hydraulic fluid under pressure connected to the sealed chamber in said hydraulic cylinder by at least one tube and control valves in the fluid pressure system to control the hydraulic force exerted against the top of the piston in said hydraulic cylinder.

2. A cylinder de-activator system for an internal combustion engine as recited in claim 1 wherein said hydraulic means for varying the fulcrum position of said rocker lever further comprises adjustable means for positioning said hydraulic cylinder a predetermined height above said sleeve.

3. A cylinder de-activator system for an internal combustion engine as recited in claim 2 wherein said means for positioning said hydraulic cylinder a predetermined height above said sleeve comprises a second mounting stud coupled at its lower end to the top of said first mounting stud with its top end coupled to a mounting plug that forms the bottom wall that closes the lower end of said hydraulic cylinder.

4. A cylinder de-activator system for an internal combustion engine as recited in claim 3 wherein the top of said second mounting stud is threaded into a threaded bore in said mounting plug whereby the height of the hydraulic cylinder above said sleeve can be adjusted.

5. A cylinder de-activator system for an internal combustion engine as recited in claim 1 further comprising means on the lower end of said push rod for de-activating its reciprocating travel by taking it out of cam follower contact with its cam when the fulcrum position on said first mounting stud is raised to its inoperative height.

6. A cylinder de-activator system for an internal combustion engine as recited in claim 5 wherein said means on the lower end of said push rod for de-activating its reciprocating travel comprises a valve lifter attached to the lower end of said push rod and magnetic means for locking the bottom of said valve lifter out of cam follower contact with its cam.

* * * * *